3,205,212
PRODUCTION OF CIS-1,4-POLYBUTADIENE WITH
A TiCl$_4$–TiI$_4$–AlR$_3$ CATALYST
Floyd E. Naylor, Bartlesville, Okla., and John R. Hooton, Hyattsville, Md., assignors to Phillips Petroleum Company, a corporation of Delaware
No Drawing. Filed Aug. 11, 1958, Ser. No. 754,175
9 Claims. (Cl. 260—94.3)

This invention relates to a process for polymerizing 1,3-butadiene so as to obtain a rubbery polymer. In one aspect, the invention relates to a process for producing cis-1,4-polybutadiene and to a novel catalyst system therefor.

Numerous methods are described in the literature for polymerizing 1,3-butadiene, including emulsion polymerization, alkali metal-catalyzed polymerization, and alfin-catalyzed polymerization. Emulsion polymerization of 1,3-butadiene gives a polymer with from about 60 to about 80 percent trans-1,4-addition, from about 5 to about 20 percent cis-1,4-addition, and from about 15 to about 20 percent 1,2-addition. Sodium-catalyzed polybutadiene has from about 60 to about 75 percent 1,2-addition, the remainder being cis and trans-1,4-addition. When potassium and other alkali metals are employed as catalysts, the latter ratios may vary to some degree. Alfin-catalyzed polybutadiene has from about 65 to about 75 percent trans-1,4-addition, from about 5 to about 10 percent cis-1,4-addition and from about 20 to about 25 percent 1,2-addition. It appears that until quite recently no polymer of butadiene has been produced which contains more than about 35 percent cis-1,4-configuration. It has recently been discovered that a polymer of butadiene containing a very high percentage of cis-1,4-addition can be obtained by employing a catalyst comprising certain organometals and titanium tetraiodide. The discovery has also recently been made that when a catalyst comprising certain organometals and titanium tetrachloride is contacted with 1,3-butadiene, a polymer can be produced which contains a small percentage, e.g., from 2 to 3 percent, of terminal vinyl groups, the remainder of the polymer molecule being about equally divided between additions of a cis-1,4-nature and a trans-1,4-nature. In accordance with the instant invention, a process is provided for preparing a polybutadiene of high cis-1,4-content, which possesses unusual properties.

It is an object of the invention to provide a novel process for producing a rubbery polymer of 1,3-butadiene.

Another object of the invention is to provide a process for polymerizing 1,3-butadiene in which the rubbery polymer product produced contains a high percentage of cis-1,4-addition.

A further object of the invention is to provide a process for preparing a cis-1,4-polybutadiene which is a "snappy" or "nervy" polymer.

A further object of the invention is to provide a novel catalyst system for use in the preparation of a "snappy" or "nervy" polybutadiene of high cis-1,4-content.

Other and further objects and advantages of the invention will become apparent to those skilled in the art upon consideration of the accompanying disclosure.

The instant invention resides in the discovery of a process for producing a "snappy" or "nervy" polymer of 1,3-butadiene and in a novel catalyst system for use in the process. Broadly speaking, the process comprises contacting 1,3-butadiene with a catalyst comprising (a) a compound corresponding to the formula R$_3$Al, wherein R is an alkyl radical containing from 1 to 12, inclusive, carbon atoms, (b) titanium tetrachloride, and (c) titanium tetraiodide. Examples of organo aluminum compounds corresponding to the aforementioned formula which can be employed in the process include trimethylaluminum, triethylaluminum, triisobutylaluminum, tri-n-pentylaluminum, triisooctylaluminum, tri-n-dodecylaluminum, and the like.

The polybutadiene produced in accordance with the instant invention differs from the polybutadiene described in the prior art in that the instant polybutadiene is a "snappy" or "nervy" polymer having a high percentage of cis-1,4-addition. The term "snappy" or "nervy" as used herein is intended to define a polymer having a firm texture, which in the raw or uncompounded state possesses a very high resistance to pull but which when stretched immediately snaps back to essentially its original length or shape. A polymer possessing this property is to be compared with a polybutadiene obtained by emulsion polymerization, which has a cheese-like consistency and tends to crumble when pulled or stretched. As mentioned hereinbefore, a polybutadiene having a very high percentage of cis-1,4-addition can be prepared by polymerizing 1,3-butadiene in the presence of a catalyst comprising an organometal and titanium tetraiodide. While the polybutadiene obtained by this latter process is difficult to pull, it has a tendency to break when sufficient force is applied. The polybutadiene of this invention, on the other hand, when stretched and then released immediately returns to its original length.

The polybutadiene of this invention possesses the further advantage in that it is very well adapted to a milling operation. This is due to the fact that the polymer adheres to the mill rolls better during the early stages of milling than do other polybutadienes. It is also much more economical to produce a polybutadiene having a high cis content by the process of this invention than by the process which utilizes a catalyst comprising an organometal and titanium tetraiodide. Thus, it is possible to obtain such a product by the instant process while using a smaller amount of the titanium tetraiodide, which is by far the most expensive of the catalyst materials. In other words, the cost of the catalyst per pound of polymer is much less when proceeding in accordance with the instant invention.

The mol ratio of the organo aluminum compound corresponding to the formula R$_3$Al to the titanium tetraiodide is in the range of 2:1 to 100:1. The mol ratio of the organo aluminum compound to the titanium tetrachloride is in the range of 2:1 to 100:1 while the mol ratio of titanium tetrachloride to titanium tetraiodide is in the range of 0.5:1 to 5:1. The minimum catalyst level below which conversion is not obtained is about 1.0 gram millimole of organo aluminum compound per 100 grams of the 1,3-butadiene to be polymerized. The upper catalyst level is dependent upon the desired molecular ratio; however, from a practical viewpoint, it should not be above about 20 gram millimoles of organo aluminum compound per 100 grams of 1,3-butadiene.

The polymerization process of this invention is usually carried out in the presence of a diluent. Diluents suitable for use in the process are hydrocarbons which are not detrimental to the polymerization reaction. Suitable diluents include aromatics, such as benzene, toluene, xylene, ethylbenzene and mixtures thereof. It is also within the scope of the invention to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentane (isooctane), normal decane, and the like. Mixtures of these paraffinic hydrocarbons can also be employed as diluents in the practice of the process of this invention. Cycloparaffins, such as cyclohexane and methylcyclohexane, can also be used. Furthermore, mixtures of any of the aforementioned hydrocarbons can be used is diluents.

The polymerization method of this invention can be carried out at any temperature within the range of −100 to 175° F. The polymerization reaction can be carried out under autogenous pressure or any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction. It is to be understood also that it is within the scope of the invention to carry out the polymerization in the solid phase.

The process of this invention can be carried out as a batch process by charging 1,3-butadiene into a reactor containing catalyst and diluent. Although any suitable charging procedure can be used, it is usually preferred to add the catalyst components to a reactor containing diluent and thereafter introduce the 1,3-butadiene. It is also within the scope of the invention to preform the catalyst by reacting the catalyst components in a separate catalyst preparation vessel. The resulting reaction product is then charged to the reactor containing monomer and diluent, or these latter materials can be added after the catalyst. The process can also be carried out continuously by maintaining the abovementioned concentrations of reactants in the reactor for a suitable residence time. The residence time in a continuous process will, of course, vary within rather wide limits depending upon such variables as temperature, pressure, the ratio of catalyst components, and the catalyst concentrations. In a continuous process, the residence time will generally fall within the range of 1 second to 1 hour when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is highly desirable, therefore, that the 1,3-butadiene be freed of these matreials as well as other materials which tend to inactivate the catalyst. Any of the known means for removing such contaminants can be used. Also, when a diluent is employed in the process, it is preferred that this material be substantially free of impurities such as water, oxygen and the like. In this connection, it is desirable to remove air and moisture from the reaction vessel in which the polymerization is conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which may be tolerated in the reaction mixture is insufficient to cause complete deactivation of the catalyst.

At the completion of the polymerization reaction, when a batch process is use, the total reaction mixture is then treated to inactivate the catalyst and precipitate the rubbery product. Any suitable method can be utilized for carrying out this treatment of the reaction mixture. In one suitable method, a catalyst-inactivating material, such as water or an alcohol, is added to the mixture so as to inactivate the catalyst and cause precipitation of the polymer. The polymer is then separated from the alcohol or water and diluent by any suitable means such as decantation or filtration. It is often preferred to add initially only an amount of the catalyst-inactivating material which is sufficient to inactivate the catalyst without causing precipitation of the dissolved polymer. It has also been found to be adventageous to add an antioxidant, such as phenyl-beta-naphthylamine, to the polymer solution prior to precipitation of the polymer. After addition of the catalyst-inactivating agent and the antioxidant, the polymer present in the solution can then be separated by the addition of an excess of a material such as ethyl alcohol or isopropyl alcohol. When the process of the invention is carried out continuously, the total effluent from the reactor can be pumped from the reactor to a catalyst-inactivating zone wherein the reactor effluent is contacted with a suitable catalyst-inactivating material, such as an alcohol. When an alcohol is used as a catalyst-inactivating material, it also functions to precipitate the polymer. In the event other catalyst-inactivating materials are employed, which do not perform this dual role, a suitable material, such as an alcohol, can then be added to precipitate the polymer. It is, of course, to be realized that it is within the scope of the invention to employ other suitable means to recover the polymer from solution. After separation from the solvent mixture and alcohol by filtration or other suitable means, the polymer is dried.

The polymers produced in accordance with this invention are rubbery polymers. The polymers can be compounded by the various methods such as have been used in the past for compounding natural and synthetic rubbers. Vulcanization accelerators, vulcanizing agents, reinforcing agents, and fillers such as have been employed in natural rubber can likewise be used when compounding the polymers of this invention. It is also within the scope of the invention to blend the polymers with other polymers, such as natural rubber, polyethylene, and the like. As mentioned hereinbefore, the polymers of this invention have a high cis-1,4-content which renders them very suitable for applications requiring low hysteresis, high resiliency, low freeze point and easy milling. In general, the polymers have utility in applications where natural and synthetic rubbers are used. They are particularly useful in the manufacture of automobile and truck tires and other rubbery articles, such as gaskets.

A more comprehensive understanding of the invention can be obtained by referring to the following illustrative examples which are not intended, however, to be unduly limitative of the invention.

Samples of certain of the polymer products produced in the runs described in the examples were examined by infrared analysis. This work was carried out in order to determine the percentage of the polymer formed by cis-1,4-addition, trans-1,4-addition, and 1,2-addition of the butadiene. The procedure described hereinafter was employed in making these determinations.

The polymer samples were dissolved in carbon disulfide to form a solution having 20 grams of polymer per liter of solution. The infrared spectrum of each of the solutions (percent transmission) was then determined in a commercial infrared spectrometer.

The percent of the total unsaturation present as trans-1,4- was calculated according to the following equation and consistent units:

$$\epsilon = \frac{E}{tc}$$

where $\epsilon$=extinction coefficient (liters - mols$^{-1}$ - centimeters$^{-1}$); $E$=extinction (log $I_0/I$); $t$=path length (centimeters); and $c$=concentration (mols double bond/liter). The extinction was determined at the 10.35 micron band and the extinction coefficient was 133 (liters-mols$^{-1}$-centimeters$^{-1}$).

The percent of the total unsaturation as 1,2- (or vinyl) was calculated according to the above equation, using the 11.0 micron band and an extinction coefficient of 184 (liters-mols$^{-1}$-centimeters$^{-1}$).

The percent of the total unsaturation present as cis-1,4- was obtained by subtracting the trans 1,4- and 1,2- (vinyl) determined according to the above procedures, from the theoretical unsaturation, assuming one double bond per each $C_4$ unit in the polymer.

EXAMPLE I

A series of polymerization runs was carried out in which 1,3-butadiene was polymerized by means of a catalyst system consisting of triisobutylaluminum, titanium tetrachloride and titanium tetraiodide. The runs were carried out in accordance with the following recipe:

| | Parts by weight |
|---|---|
| 1,3-butadiene | 100 |
| Toluene | Variable |
| Triisobutylaluminum (TIBA) | Variable |
| Titanium tetrachloride (TTC) | Variable |
| Titanium tetraiodide (TTI) | Variable |
| TIBA/TTC/TTI mol ratio | Variable |
| Polymerization temperature, °F. | 140 |
| Time, hours | Variable |
| Antioxidant,[1] per 100 parts monomer _____parts | 2.0 |

[1] Phenyl-beta-naphthylamine.

The results of these runs, which were carried out in 12-ounce bottles, are set forth hereinbelow in Tables I, II and III. The charging procedure was to charge the triisobutylaluminum and a major proportion of the diluent to the bottle and then weigh in the titanium tetraiodide. The titanium tetrachloride was then charged to the bottles as a solution in the remainder of the diluent. The 1,3-butadiene was then charged to the bottles which were thereafter placed in a water bath maintained at 140° F. The polymers were recovered by first adding the antioxidant as a 2 weight percent solution in isopropyl alcohol, stirring until the catalyst color disappeared, adding an equal volume of isopropyl alcohol to coagulate the polymer, and washing the coagulated polymer with boiling water.

*Table I*
EFFECT OF VARIABLE SOLVENT LEVEL ON CONVERSION

| Run No. | Parts by wt. toluene | TIBA/TTC/TTI, mol ratio | Parts by wt. TIBA | Millimoles TIBA | Time, hrs. | Conv., percent |
|---|---|---|---|---|---|---|
| 1 | 200 | 45/2.5/1 | 1.4 | 7.0 | 17 | 27 |
| 2 | 250 | 45/2.5/1 | 1.4 | 7.0 | 17 | 26 |
| 3 | 300 | 45/2.5/1 | 1.4 | 7.0 | 17 | 34 |
| 4 | 350 | 45/2.5/1 | 1.4 | 7.0 | 17 | 34 |
| 5 | 400 | 45/2.5/1 | 1.4 | 7.0 | 17 | 34 |
| 6 | 440 | 45/2.5/1 | 1.4 | 7.0 | 17 | 41 |
| 7 | 500 | 45/2.5/1 | 1.4 | 7.0 | 17 | 44 |

*Table II*
EFFECT OF VARIABLE TIBA LEVEL ON CONVERSION AND MOONEY VISCOSITY

| Run No. | Parts by wt. Toluene | TIBA/TTC/TTI, mol ratio | Parts by wt. TIBA | Millimoles TIBA | Time, hrs. | Conv., percent | Mooney viscosity (ML-4) |
|---|---|---|---|---|---|---|---|
| 8 | 440 | 45/2.5/2.5 | 0.8 | 4.0 | 18 | 71 | 94 |
| 9 | 440 | 45/2.5/2.5 | 0.9 | 4.5 | 18 | 53 | 47 |
| 10 | 440 | 45/2.5/2.5 | 1.0 | 5.0 | 18 | 55 | 32 |
| 11 | 440 | 45/2.5/2.5 | 1.1 | 5.5 | 18 | 48 | 23 |
| 12 | 440 | 45/2.5/2.5 | 1.2 | 6.0 | 18 | 48 | 14 |
| 13 | 440 | 45/2.5/2.5 | 1.3 | 6.5 | 18 | 45 | 10 |

*Table III*
EFFECT OF VARIABLE CATALYST RATIO ON DEGREE OF POLYMERIZATION

| Run No. | Parts by wt. Toluene | TIBA/TTC/TTI, mol ratio | Parts by wt. TIBA | Millimoles TIBA | Time, hrs. | Conv., percent | Mooney viscosity (ML-4) |
|---|---|---|---|---|---|---|---|
| 14 | 440 | 45/2.5/1.0 | 1.4 | 7.0 | 17 | 41 | (1) |
| 15 | 440 | 45/2.5/1.5 | 1.4 | 7.0 | 17 | 55 | (1) |
| 16 | 440 | 45/2.5/2.0 | 1.4 | 7.0 | 17 | 80 | (1) |
| 17 | 440 | 45/2.5/2.5 | 1.4 | 7.0 | 17 | 92 | (1) |
| 18 | 440 | 50/2.5/2.5 | 1.4 | 7.0 | 18 | 67 | 64 |
| 19 | 440 | 45/2.5/2.5 | 1.4 | 7.0 | 18 | 74 | 46 |
| 20 | 440 | 40/2.5/2.5 | 1.4 | 7.0 | 18 | 73 | 28 |
| 21 | 440 | 30/2.5/2.5 | 1.4 | 7.0 | 18 | 90 | <10 |
| 22 | 440 | 20/2.5/2.5 | 1.4 | 7.0 | 18 | 94 | <10 |
| 23 | 440 | 10/2.5/2.5 | 1.4 | 7.0 | 18 | 81 | <10 |
| 24 | 440 | 5/2.5/2.5 | 1.4 | 7.0 | 18 | 51 | <10 |

[1] Not measured.

The polymers obtained in the runs shown in Tables I, II and III were "snappy" or "nervy" polymers of 1,3-butadiene. In other words, the polymers recovered from the runs could be stretched without breaking and upon release immediately recovered their original form.

EXAMPLE II

A series of runs was carried out in a 5-gallon reactor in which the same polymerization recipe as described in Example I was used. In these runs, the catalyst was preformed by three different methods before being charged to the reactor. In one method, preformed concentrated catalyst (runs 25 to 30) was prepared by dissolving the titanium tetraiodide in the titanium tetrachloride and then adding this solution to a solution of the triisobutylaluminum in a small portion of the toluene diluent. In accordance with another method, preformed dilute catalyst (runs 31 to 36) was prepared by adding the titanium tetraiodide to a solution of the titanium tetrachloride in a portion of the toluene diluent, after which the resulting solution was then added to a solution of the triisobutylaluminum in a major portion of the toluene diluent. A second preformed concentrated catalyst (runs 37 to 45) was prepared in a third method by adding a solution of triisobutylaluminum in toluene to a solution of the titanium tetraiodide in the titanium tetrachloride. In each of the runs, the mol ratio of triisobutylaluminum to titanium tetrachloride to titanium tetraiodide was 50 to 2.5 to 2.5. The results of the runs are shown hereinbelow in Table IV, in which appropriate headings are utilized in order to designate the method used in preparing the preformed catalyst. Dashes in the table indicate that the property in question was not measured.

It is seen from the data in Table IV that the polybutadiene product contained a high percentage of cis-1,4-addition. In general, the polybutadiene contains at least 85 percent cis-1,4-addition, and by proper control of certain process variables, e.g., catalyst level, catalyst ratio and temperature, a polymer can be obtained in which 95 percent or more of the polymer is formed by cis-1,4-addition of the butadiene. The products obtained in the runs shown in Table IV were "snappy" or "nervy" polymers as described hereinbefore.

EXAMPLE III

The polymers from runs 29 and 30 shown in Table IV were compounded and evaluated. The following recipe was employed in compounding the polymers:

| | Parts by weight |
|---|---|
| Polymer | 100 |
| Philblack O [1] | 50 or 75 |
| Zinc oxide | 3 |
| Stearic acid | 2 |
| Disproportionated pale resin | 5 |
| Antioxidant [2] | 1 |
| Sulfur | 1.75 |
| Accelerator [3] | 1.1 or 1.25 |

[1] High abrasion furnace black.
[2] Physical mixture containing 65 weight-percent of a complex diarylamine-ketone reaction product and 35 weight percent of N,N'-diphenyl-p-phenylene-diamine.
[3] N-oxydiethylene-2-benzothiazyl sulfenamide.

After compounding, the polymers were cured for 30 minutes at 307° F. and oven aged for 24 hours at 212° F. The properties of the cured polymers are shown hereinbelow in Table V.

Table IV
RUNS USING PREFORMED CONCENTRATED CATALYST

| Run No. | Millimoles TIBA | Parts by wt. toluene | Time, hrs. | Conv., percent | Mooney viscosity (ML-4) | After milling | | Configuration | | |
|---|---|---|---|---|---|---|---|---|---|---|
| | | | | | | Inherent viscosity | Gel, percent | Trans | Vinyl | Cis |
| 25 | 7 | 440 | 21 | 25 | 13 | 0.85 | 0 | | | |
| 26 | 3 | 175 | 20 | 40 | 15 | | | | | |
| 27 | 5 | 175 | 19 | 34 | too low | 2.21 | 15 | 9.5 | 8.5 | 82.0 |
| 28 | 7 | 440 | 18 | 53 | too low | 1.02 | | | | |
| 29 | 3 | 175 | 20 | 65 | too low | 1.43 | 4 | 9.0 | 6.0 | 85.0 |
| 30 | 3 | 175 | 46 | 42 | 24 | 2.25 | 3 | 7.0 | 7.0 | 86.0 |

RUNS USING PREFORMED DILUTE CATALYST

| 31 | 4 | 440 | 22 | 79 | 96 | 2.84 | 7 | | | |
| 32 | 5 | 440 | 18 | 53 | 54 | 2.45 | 5 | 5.0 | 5.5 | 89.5 |
| 33 | 5 | 440 | 20 | 51 | 8 | 1.55 | trace | | | |
| 34 | 4 | 440 | 22 | 60 | 125 | 3.10 | trace | | | |
| 35 | 5 | 440 | 19 | 31 | 91 | 2.66 | 6 | 4.5 | 6.0 | 89.5 |
| 36 | 5 | 440 | 18 | 32 | 30 | 1.79 | trace | 10.5 | 5.5 | 84.0 |

RUNS USING PREFORMED CONCENTRATED CATALYST II

| 37 | 4.5 | 440 | 16 | 48 | too high | | | | | |
| 38 | 4.5 | 440 | 20 | 22 | 33 | 2.16 | trace | | | |
| 39 | 4.5 | 440 | 18 | 84 | 16 | 1.87 | 0 | | | |
| 40 | 5.0 | 440 | 16 | 31 | 45 | 2.98 | 0 | 4.0 | 7.0 | 89.0 |
| 41 | 4.5 | 440 | 42 | 52 | 14 | 1.71 | 0 | | | |
| 42 | 4.5 | 440 | 21 | 41 | 58 | 2.77 | 2 | 4.0 | 7.0 | 89.0 |
| 43 | 5.0 | 440 | 23 | 17 | 40 | 2.86 | 6 | 4.5 | 7.0 | 88.5 |
| 44 | 4.5 | 440 | 45 | 34 | 22 | 2.06 | 0 | 4.5 | 6.0 | 89.5 |
| 45 | 5.0 | 440 | 23 | 31 | 29 | 2.50 | 9 | 5.0 | 6.5 | 88.5 |

Table V

| | Uncured uncompounded rubber | | 30 min. cure at 307° F. | | | Oven aged at 212° F. | | |
|---|---|---|---|---|---|---|---|---|
| | Run 29 | Run 30 | Run 29 [1] | Run 30 [2] | Run 29 [3] | Run 29 [4] | Run 30 [5] | Run 29 [6] |
| Mooney viscosity: [7] | | | | | | | | |
| ML-4 | 13 | 24 | | | | | | |
| MS-1½ at 212° F | | | 20 | 36 | 40 | | | |
| Vr [8] | | | .382 | 4.09 | .420 | | | |
| Compression set, percent [9] | | | 21.5 | 14.1 | 18.4 | | | |
| 300% modulus, p.s.i. [10] | | | 4,170 | 1,650 | | | | |
| Tensile, p.s.i. [10] | | | 1,800 | 2,050 | 1,525 | 1,640 | 1,490 | 2,220 |
| Elongation, percent [10] | | | 360 | 365 | 180 | 210 | 200 | 180 |
| 200° F. maximum tensile, p.s.i. [10] | | | 1,120 | 1,340 | 1,090 | | | |
| Hysteresis ΔT, ° F. [11] | | | 54.4 | 47.3 | 76.3 | 40.5 | 40.5 | 60.5 |
| Resilience, percent [11] | | | 70.8 | 70.6 | 60.2 | 78.3 | 77.1 | 67.7 |
| Flex life, M [11] | | | 2.7 | 2.0 | <0.1 | <0.1 | <0.1 | <0.1 |
| Shore A hardness [12] | | | 58 | 64.5 | 74 | 67 | 71.5 | 80 |
| Gehman freeze point [13] | | | −96 | −95 | −95 | | | |
| Swell, percent [14] | | | 159.4 | 143.3 | 130.0 | | | |
| Scorch at 280° F.: [15] 5 point rise, minutes | | | 19 | 12 | 13 | | | |
| Extrusion at 250° F.: [16] | | | | | | | | |
| in./min | | | 52.0 | 30.1 | 54.0 | | | |
| g./min | | | 117.5 | 74.0 | 88.0 | | | |

[1] 1.25 phr. accelerator and 50 phr. Philblack O.
[2] 1.1 phr. accelerator and 50 phr. Philblack O.
[3] 1.25 phr. accelerator and 75 phr. Philblack O.
[4] 1.25 phr. accelerator and 50 phr. Philblack O.
[5] 1.1 phr. accelerator and 50 phr. Philblack O.
[6] 1.25 phr. accelerator and 75 phr. Philblack O.
[7] ASTM D927-55T.
[8] The volume fraction of rubber in the swollen network when a sample of rubber is allowed to swell in a solvent. This value is related to the degree of curve and is discussed in detail in an article by G. Kraus, Rubber World, vol. 135, No. 1, pages 67–73 (1956) and vol. 135, No. 2, pages 254–260 (1956).
[9] ASTM 395-55.
[10] ASTM D412-51T.
[11] ASTM D632-55T.
[12] ASTM D676-55T.
[13] ASTM D1053-52T.
[14] In 70/30 isooctane/toluene at 158° F. for 2 days.
[15] Scorch is determined on a Mooney viscometer at 280° F. using the large rotor (ML-4). The scorch time is the time required for the Mooney value to rise a given amount above the minimum. The procedure is essentially the same as described by Shearer et al., Indian Rubber World 117, 216–9 (1947).
[16] Extrusion is carried out at 250° F. by essentially the same procedure as described by Garvey et al., Ind. & Eng. Chem. 34, 1309 (1942).

As will be evident to those skilled in the art, many variations and modifications of this invention can be practiced in view of the foregoing disclosure. Such variations and modifications are clearly believed to come within the spirit and scope of the invention.

We claim:

1. A process for producing a rubbery polymer of 1,3-butadiene which comprises contacting under polymerization conditions 1,3-butadiene with a catalyst consisting essentially of (a) a compound corresponding to the formula $R_3Al$, wherein R is an alkyl radical containing from 1 to 12, inclusive, carbon atoms, (b) titanium tetrachloride, and (c) titanium tetraiodide, the mol ratio of said $R_3Al$ compound to said titanium tetrachloride being in the range of 2:1 to 100:1, the mol ratio of said $R_3Al$ compound to said titanium tetraiodide being in the range of 2:1 to 100:1, and the mol ratio of said titanium tetrachloride to said titanium tetraiodide being in the range of 0.5:1 to 5:1.

2. The process according to claim 1 in which said catalyst consists essentially of triisobutylaluminum, titanium tetrachloride and titanium tetraiodide.

3. The process according to claim 1 in which said catalyst consists essentially of triethylaluminum, titanium tetrachloride and titanium tetraiodide.

4. The process according to claim 1 in which said catalyst consists essentially of triisopropylaluminum, titanium tetrachloride and titanium tetraiodide.

5. A process for producing a rubbery polymer of 1,3-butadiene which comprises contacting 1,3-butadiene with a catalyst consisting essentially of (a) a compound corresponding to the formula $R_3Al$, wherein R is an alkyl radical containing from 1 to 12, inclusive, carbon atoms, (b) titanium tetrachloride, and (c) titanium tetraiodide, the mol ratio of said $R_3Al$ compound to said titanium tetrachloride being in the range of 2:1 to 100:1, the mol ratio of said $R_3Al$ compound to said titanium tetraiodide being in the range of 2:1 to 100:1, the mol ratio of said titanium tetrachloride to said titanium tetraiodide being in the range of 0.5:1 to 5:1, and the minimum amount of said $R_3Al$ compound being about 1.0 gram millimole of said $R_3Al$ compound per 100 grams of said 1,3-butadiene, said contacting occurring in the presence of a hydrocarbon diluent; and recovering the rubbery polymer so produced.

6. A process for producing a rubbery polymer of 1,3-butadiene which comprises contacting 1,3-butadiene with a catalyst consisting essentially of (a) a compound corresponding to the formula $R_3Al$, wherein R is an alkyl radical containing from 1 to 12, inclusive carbon atoms, (b) titanium tetrachloride, and (c) titanium tetraiodide, the mol ratio of said $R_3Al$ compound to said titanium tetrachloride being in the range of 2:1 to 100:1, the mol ratio of said $R_3Al$ compound to said titanium tetraiodide being in the range of 2:1 to 100:1, the mol ratio of said titanium tetrachloride to said titanium tetraiodide being in the range of 0.5:1 to 5:1, and the minimum amount of said $R_3Al$ compound being about 1.0 gram millimole of said $R_3Al$ compound per 100 grams of said 1,3-butadiene said contacting occurring in the presence of a hydrocarbon diluent at a temperature in the range of −100 to 175° F. and under autogeneous pressure; and recovering the rubbery polymer so produced.

7. The process according to claim 6 wherein said diluent consists essentially of toluene.

8. The process according to claim 6 wherein said diluent consists essentially of benzene.

9. The process according to claim 6 wherein said diluent consists essentially of paraffinic hydrocarbons.

References Cited by the Examiner

UNITED STATES PATENTS

| 2,832,759 | 4/58 | Nowlin et al. | 260—94.2 |
| 2,905,659 | 9/59 | Miller | 260—85.3 |
| 2,906,742 | 9/59 | Thomka | 260—94.9 |
| 2,938,019 | 5/60 | Stuart | 260—93.7 |

FOREIGN PATENTS 554,271  7/57  Belgium.

JOSEPH L. SHOFER, *Primary Examiner.*

DONALD ARNOLD, L. H. GASTON, MORRIS LIEBMAN, *Examiners.*